(12) United States Patent
McAlinden et al.

(10) Patent No.: US 7,539,994 B2
(45) Date of Patent: May 26, 2009

(54) DYNAMIC PERFORMANCE AND RESOURCE MANAGEMENT IN A PROCESSING SYSTEM

(75) Inventors: Paul McAlinden, Austin, TX (US); Scott C. Glenn, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1156 days.

(21) Appl. No.: 10/336,132

(22) Filed: Jan. 3, 2003

(65) Prior Publication Data

US 2004/0153867 A1 Aug. 5, 2004

(51) Int. Cl.
*G06F 9/46* (2006.01)
*G06F 1/00* (2006.01)
*G06F 1/26* (2006.01)

(52) U.S. Cl. .................. 718/104; 713/300; 713/320; 713/322

(58) Field of Classification Search ............... 718/104; 340/7.32; 713/300, 322, 340, 320; 714/47
See application file for complete search history.

(56) References Cited

U.S. PATENT DOCUMENTS

| | | |
|---|---|---|
| 6,192,480 B1 * | 2/2001 | Barrus .................. 713/320 |
| 6,952,782 B2 * | 10/2005 | Staiger ................. 713/300 |
| 7,065,659 B2 * | 6/2006 | Malueg et al. ........... 713/300 |

OTHER PUBLICATIONS

Silberschatz et al., Operating System Concepts, 1999, John Wiley & Sons, Fifth Edition, p. 35.*

* cited by examiner

*Primary Examiner*—Meng-Ai An
*Assistant Examiner*—Kenneth Tang
(74) *Attorney, Agent, or Firm*—Schwegman, Lundberg & Woessner, P.A.

(57) ABSTRACT

A system may monitor, store, and retrieve resource requirements to improve system resources, including energy resources, when executing one or more applications.

8 Claims, 3 Drawing Sheets

DYNAMIC PERFORMANCE AND RESOURCE MANAGEMENT IN A PROCESSING SYSTEM

BACKGROUND INFORMATION

Systems, including processing systems and machines, may execute a wide variety of applications. Such applications may be executed one-at-a-time or concurrently. Some applications require all of the computational resources of the executing system, while others require very little of such resources. The processing speed of certain processors may be varied.

A system operating its processor(s) at highest operational frequency only to execute one or more applications requiring relatively low computational power is not operating efficiently. Moreover, if such a system is battery-powered, it may quickly deplete its energy resources. Generally, in a processing system, power demand is directly proportional to processor frequency.

Thus, there is a general need to improve the management of performance and resources in processing apparatus and methods.

DETAILED DESCRIPTION

In the following detailed description of embodiments of the invention, reference is made to the accompanying drawings that form a part hereof, and in which is shown by way of illustration, but not of limitation, specific embodiments of the invention. These embodiments are described in sufficient detail to enable those skilled in the art to understand and implement them, and it is to be understood that other embodiments may be utilized and that mechanical, structural, electrical, functional, and procedural changes may be made without departing from the spirit and scope of the present disclosure. The following detailed description is, therefore, not to be taken in a limiting sense, and the scope of embodiments of the invention is defined only by the appended claims.

In embodiments of the present subject matter, an electronic system, such as a computer system, cellular telephone, entertainment device, or the like, may control its performance resources and energy resources, using application-based resource requirements. The application-based resource requirements are sometimes referred to herein as application performance requirements. One or more application resource requirements may be referred to collectively as an Application Performance Requirements Interface (APRI).

A system may base resource allocation and resource performance decisions on APRIs associated with applications that the system is to execute. As an example, the processing element of an audio player may operate at different speeds, depending upon the type of audio files being performed. As another example, a laptop computer may operate at a higher speed to support video editing than to support word-processing. A cellular telephone may operate at a lower speed to support a standard voice call than to transmit a photograph over the Internet. Many other examples are possible, depending upon the type of system and the type of application.

A system may monitor and measure performance characteristics of one or more applications during execution, and the system may identify one or more performance requirements for such applications. The identified performance requirements may be recorded or stored for future reference, for example, in a resource storage log and/or in one or more resource description tables. In some embodiments, performance requirements for an application may be identified and updated during subsequent execution(s) of the application.

Various methods of measuring and managing performance resources of a system are described herein. Also described herein are applications, modules, and systems, as well as an article comprising a machine-accessible medium containing data, which when accessed, result in a machine performing operations to monitor, store, and/or manage performance resources.

Figure 1:
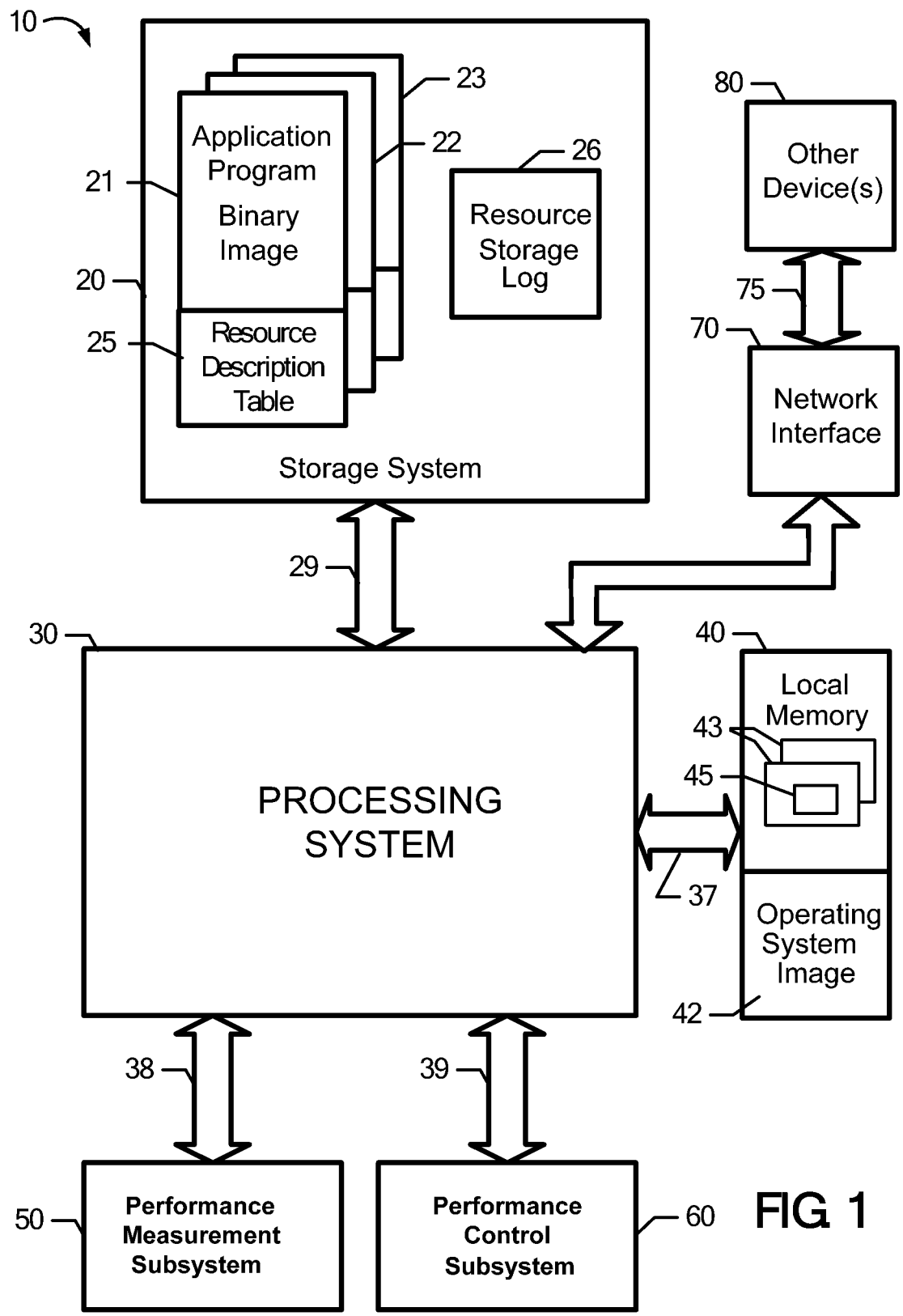
FIG. 1 is a block diagram of an example system or platform to provide performance and resource management, in accordance with an embodiment of the invention.

FIG. 1 is a block diagram of an example system or platform to provide performance and resource management, in accordance with an embodiment of the invention.

The block diagram of FIG. 1 represents just one example embodiment of a system 10 to measure and/or control system performance resources. System 10 (also referred to herein as a "platform") may be of any type. For example, system 10 may be a PC (personal computer), an Internet appliance, a hand-held computer, a laptop computer, a wireless communications device (e.g., cellular phone, pager, etc.), a personal entertainment device such as a DVD (digital video disc or digital versatile disc) player, MP3 (Moving Picture Experts Group, audio layer 3) player, a radio, audio-visual equipment, a PDA (personal digital assistant), an electronic book, and the like, without limitation.

System 10 comprises a suitable processing system 30. In an embodiment, processing system 30 may include a Pentium® processor or an XScale™ processor available from Intel Corporation, Santa Clara, Calif.

The term "suitable", as used herein, means having characteristics that are sufficient to produce the desired result(s). Suitability for the intended purpose can be determined by one of ordinary skill in the art using only routine experimentation.

The term "processor", as used herein, means any type of computational circuit such as, but not limited to, a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), or any other type of processor, processing circuit, execution unit, or computational machine. The term also includes embedded controllers, such as generic or programmable logic devices or arrays, ASICs (application specific integrated circuits), single-chip computers, and the like.

Processing system 30 may be coupled to a storage system 20 via a suitable bus 29. Storage system 20 may comprise one or more application programs ("applications") 21-23. A binary image of the applications may be stored in storage system 20. In an embodiment, an application 21-23 may have an associated resource description table, such as resource description table 25 that is associated with application 21. Storage system 20 may also comprise a resource storage log 26.

Storage system 20 may be implemented with any one or more suitable memory elements (not shown) such as, but not limited to, random access memory (RAM); a hard drive; a removable media drive for handling compact disks (CDs), DVDs, diskettes, magnetic tape cartridges, memory cards, flash memory or non-volatile memory devices such as MemoryStick™ devices and SmartMedia™ devices; optical storage, chemical storage, biological storage, and/or other types of data storage; or the like. Storage system 20 could be located remotely from processing system 30 and coupled to processing system 30 via a wired or wireless link.

Processing system 30 may be coupled to a local memory 40 via a suitable bus 37. Local memory 40 may comprise an operating system image 42 and an image of one or more working applications 43 and associated data 45. As will be explained in greater detail below, the operating system image 42, when executed by the processing system 30, can cause one or more of a plurality of application program images 21-23 to be copied, either in full or in part, to the local memory 40 and to be executed by the processing system 30.

Local memory 40 may be implemented with any one or more suitable memory elements (not shown) such as, but not limited to, random access memory (RAM); read only memory (ROM); and/or other types of data storage; or the like.

Processing system 30 may be coupled to a performance measurement subsystem 50 and to a performance control subsystem 60 via suitable busses 38 and 39, respectively.

Electronic system 10 may further comprise various user interface elements (not shown) such as, but not limited to, a visual display, one or more loudspeakers, and/or a suitable user input element, such as one or more control knobs, on-screen touch-sensitive buttons, keyboard, pointing device, joy stick, and/or the like.

Electronic system 10 may store any type of software including, among other things, applications 21-23 and operating system 42. The software may include a basic input/output system (BIOS), as well as any other types of programs as required to perform the operational requirements of electronic system 10.

In some embodiments, electronic system 10 may comprise a suitable network interface 70. A network interface 70 may be included if electronic system 10 is to communicate with one or more devices 80 on a network. Such devices 80 could be of any type. Examples of such devices 80 include a server, a base station, a terminal, a remote memory system, and other equipment, whether the purpose of such equipment is primarily to support communications within the network, or primarily to be operated by a user, or a combination of purposes. A network interface 70 may couple electronic system 10 to one or more other devices 80 via any suitable communications medium 75, such as a cable, telephone line, wireless transmission (e.g. terrestrial or satellite receiver), or the like.

Electronic system 10 may further comprise other hardware and/or software elements that are suitable to accomplish the functions and purposes of electronic system 10 such as, but not limited to, measurement elements, actuating elements, telemetry elements, communicating elements, and/or the like.

Figure 2:
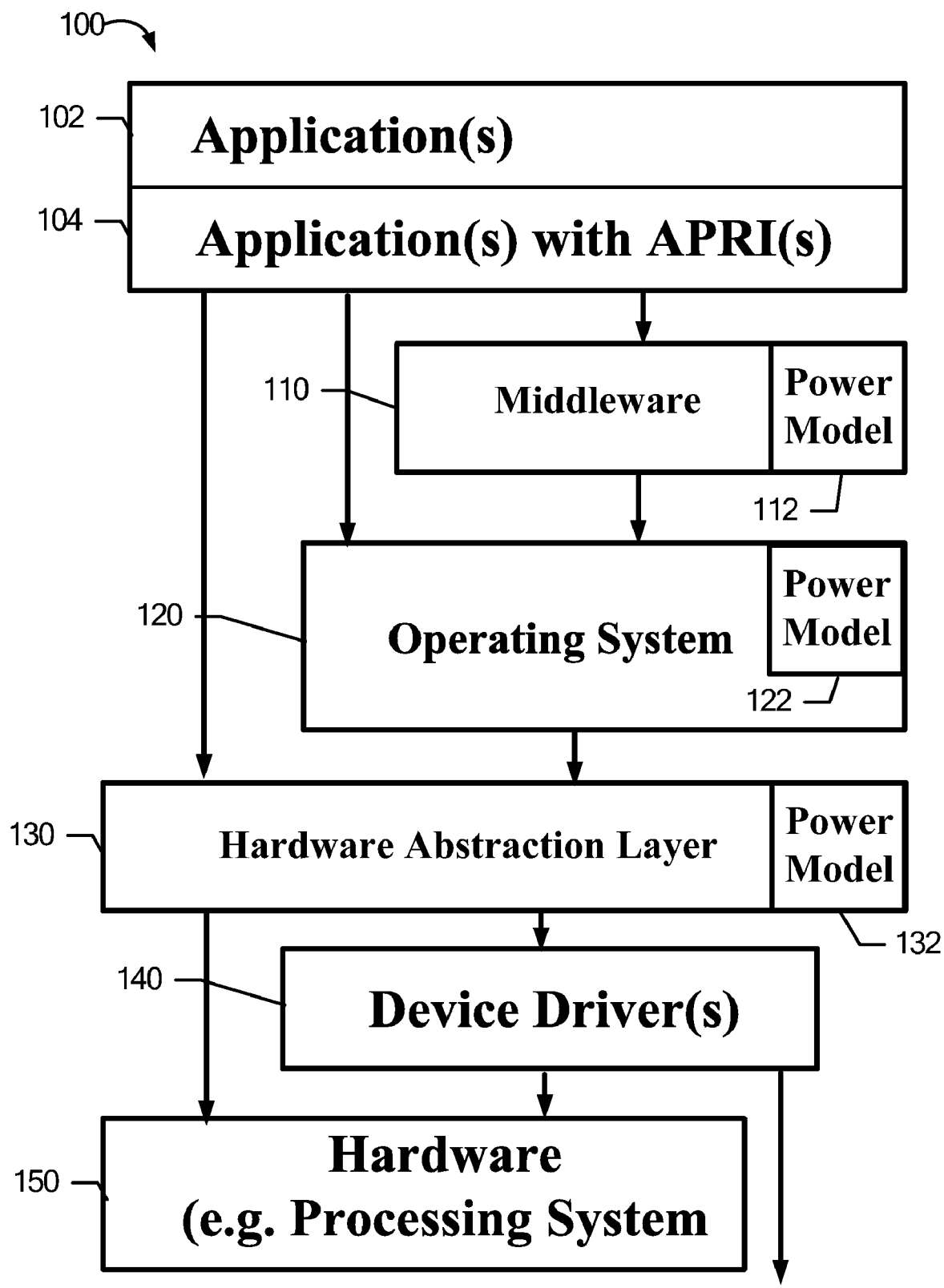
FIG. 2 is a block diagram of an architectural model of a system or platform to provide performance and resource management, in accordance with an embodiment of the invention.

FIG. 2 is a block diagram of an architectural model of a system or platform 100 to provide performance and resource management, in accordance with an embodiment of the invention.

The system 100 may comprise a plurality of applications 102, which may be of any type. In the embodiment illustrated in FIG. 2, the processing system is represented by hardware or central processing unit (CPU) 150.

The system 100 may also comprise a plurality of applications with APRIs (application performance requirements interfaces) 104, which applications may be of any type. The applications with APRIs 104 differ from other applications 102, in that applications with APRIs 104 may request performance requirements from the processing system. When the performance requirements are relatively low, the performance control subsystem (60, FIG. 1) may reduce the performance of the processing system, thus significantly reducing the power consumption of the computing platform and increasing the operating efficiency of the platform.

The performance control software may increase or decrease the performance of the platform 100 when requested by application software 104. The ability to specify performance requirements increases the operating efficiency of the platform 100 in terms of performance, resource allocation, and power consumption.

An application 104 may use an APRI to specify the current application performance requirements, to request to change the performance requirements for the application 104, and/or to request to release the performance requirements for the application 104.

An application 104 may also use an APRI to request information about the performance capabilities of the processing system 150. An APRI may also specify whether or not to notify an application 104 of platform performance changes, and whether or not to provide an acknowledgement to the application 104 when the application 104 issues a performance requirements request.

An application 104 may use an APRI statically (e.g. at the launch of the application) or dynamically (e.g. using inner loops or performance monitoring) to request additional performance or a reduction of performance requirements, as may be necessary.

For example, the processing system 150 could perform a real-time indication of machine performance, e.g. such as a continuous timing loop, to check whether the processing system 150 is idle. How often the processing system 150 is determined to be idle indicates how busy the processing system 150 is. If the processing system 150 were found to be idle 2 times out of 10, the processing system 150 is said to be operating at approximately 80% of capacity, assuming that the processing system 150 is currently operating at its highest possible frequency. If the processing system 150 were found to be idle 5 times out of 10, the processing system 150 is said to be operating at only 50% of capacity. Depending upon the level of efficiency desired, e.g. by a system user or other entity, the operational frequency of the processing system 150 could be reduced in the latter example, in order to reduce energy consumption.

Any suitable algorithm may be used to increase or decrease the operational frequency of the processing system 150. In an embodiment, the utilization of the processing system 150 is maintained at approximately 80% of the maximum operational frequency. The operational frequency may be decremented or incremented in steps if desired.

For a given APRI, one or more parameters may be passed to the system's performance control subsystem. Parameters may include but are not be limited to:

Power consumption (e.g. in watts)

Time requirements in units of time

Devices needed for the application

Performance requirements in custom units (e.g. as specified by an original equipment manufacturer (OEM), an application vendor, etc.)

Performance requirements in system software units (e.g. a percentage of central processing unit (CPU) processing capacity; a kernel-assigned priority; a specific resource allocation; etc.)

Performance requirements in APRI units (see immediately below)

APRI units may be used to define the performance requirements needed for a specific application or application software thread. An APRI unit may be of any suitable type. In an embodiment, an integer number from 1 to 5 is used, in which 5 may represent the maximum or peak performance needed by an application. A value of less than 5 indicates that the performance control subsystem may reduce the resource allocation according to a software-implemented algorithm.

Performance requirements may be used by system software or power management software (e.g. a performance control subsystem) to assign a performance allocation to the application. The performance allocation can be for any type of element, or combination of elements, to support an application. For example, the performance allocation can relate to the processor(s), or to a resource (e.g. a video or audio encoder or decoder; an encryption decoder; one or more kernel functions, etc.), or to a device (e.g. RAM, a hard drive, a display, a wireless device, etc.).

In an embodiment, a performance allocation may occur when there are multiple applications running on the processing system or platform. For example, let us refer to an Internet browser application ("Application #1") and an appointment scheduler application ("Application #2") being run on a given platform as Performance Situation #1, and a video game application ("Application #3") and a spreadsheet application ("Application #4") being run on the same platform as Performance Situation #2. Assume that Applications #3 and #4 require relatively greater processor resources than for Applications #1 and #2. Assume that a performance requirement (e.g. an APRI) for each of these applications is stored in the system. And assume that no applications are initially running on the platform.

If a system user opens Application #1 alone, the performance control subsystem, in response to the APRI for Application #1, may control the system processor to operate at only 10% of peak capacity, for example. If the system user subsequently opens Application #2, while continuing to use Application #1, the performance control subsystem, in response to the APRIs for Application #1 and Application #2, may control the system processor to operate at 30% of peak capacity, just as an example.

Now assume again that no applications are initially running on the platform, and that a system user opens Application #3 alone. The performance control subsystem, in response to the APRI for Application #3, may control the system processor to operate at 80% of peak capacity, for example. If the system user subsequently opens Application #4, while continuing to use Application #3, the performance control subsystem, in response to the APRIs for Application #3 and Application #4, may control the system processor to operate at 100% of peak capacity, just as an example.

Assume now that Application #1 and Application #2 are initially running on the platform, and that a system user opens Application #3. The performance control subsystem, in response to the APRIs for Applications #1-#3, may control the system processor to operate at 100% of peak capacity, and may open a dialog window to the system user asking whether the system user desires to close either or both of Applications #1-2, for example. If the system user indicates to close either or both of Applications #1-2, the performance control subsystem, in response to the APRIs for the remaining application(s), may control the system processor to operate at less than 100% of peak capacity, thus reducing the power demand on the system's energy resource. However, if the system user desires to maintain all three Applications #1-3 concurrently, the performance control subsystem will continue to control the system processor to operate at 100% of its peak capacity.

As another example, the system user may have indicated that he or she always desires to limit the processor to no more than 80% of peak capacity (for battery conservation) but fully dedicated to Application #3. In this case the APRI for Application #3 would reflect this user preference, and when the user opens Application #3, Applications #1-2 would close, either automatically or after providing an advisory window to the user.

As yet a further variation of the example immediately above, assume that Applications #1-2 are currently running, and that the system user has indicated that he or she always desires to operate the processor at no more than 80% of peak capacity (for battery conservation) and to give preference to Applications #1 and #3 over any other applications. In this case the APRI for Applications #1 and #3 would reflect this user preference, and if the user opens Application #3, Applications #1 would remain running, but Application #2 would close, either automatically or after providing an advisory window to the user.

From the above examples, it will be seen that the energy utilization for Performance Situation #1 is less than for Performance Situation #2. It will also be seen that the system processor can be operated at a relatively high percentage of peak capacity when demanded by the system user, e.g. for Performance Situation #2.

It will be further observed, both from the above examples and from the other disclosure herein, that the present subject matter increases the operating efficiency of a platform in which one or more applications are running. Improved operating efficiency translates into better performance for the application(s) and lower power consumption of the platform.

With a well-defined interface from application(s) to system software, a platform using batteries can decrease the discharge time, thus providing a longer operating time for the user of the platform. Furthermore, when there are multiple applications running on the processing system, APRIs may provide important information to system software to better prioritize processor and platform resources to deliver an optimum experience to a user running the application. If necessary, the performance control subsystem may inhibit the processing system from executing one or more applications, in order to give priority to processor performance, or to battery conservation, or to any combination of performance criteria that may pertain to the system.

Still referring to FIG. 2, APRIs may be implemented and exposed to applications via any suitable system elements, such as middleware (MW) 110, the operating system (OS) 120, and/or a hardware abstraction layer (HAL) 130. In an embodiment, it may be desired to use the OS 120 exclusively, because the OS 120 comprises kernel functions, and the OS 120 is aware of the schedules of all tasks, including tasks of non-application software. In another embodiment, a combination of MW 110, OS 120, and HAL 130 may be used. Other combinations are possible.

MW 110 may comprise software performing one or more functions that lie between, and possibly overlap with functions performed by, applications 102/104 and the OS 120. In an embodiment, MW 110 may comprise Intel® Performance Primitives (IPPs) available from Intel Corporation, Santa Clara, Calif.

HAL 130 may comprise software that initializes and otherwise supports various device drivers 140.

Each of the possible implementing elements (e.g. MW 110, OS 120, and/or HAL 130) may comprise a respective power model 112, 122, and 132. Power models 112, 122, and 132 comprise software elements to respond to and carry out functions requested by calls originating from APRIs.

One or more of power models 112, 122, and 132 may manage the performance, including the resources (e.g. power consumption), of processing system 30 via a programmable interface from applications 21-23. Power models 112, 122, and 132 represent a power management hardware abstraction layer of the architectural model of system 100.

Those of ordinary skill in the art will understand that other implementations and organizations of elements may be used, depending upon the system requirements, and the nature of the hardware and software elements (e.g. operating system, applications, etc.) being used.

EXAMPLE OPERATION

Performance Measurement Subsystem

During initial execution of an application program 21-23 (FIG. 1), the performance measurement subsystem 50 (FIG. 1), which may include the one or more power models 112, 122, and/or 132, observes and measures or estimates the performance requirements of the application program. The estimated performance requirements may be uniquely associated with the specific application program to which they relate.

The performance requirements may be stored in a resource storage log 26 within the storage system 20 (FIG. 1). In addition, or alternatively, the performance requirements may be stored in a resource description table (e.g. 25, FIG. 1) associated with the corresponding application.

As will be explained in greater detail below in the following section entitled "Performance Control Subsystem", upon subsequent execution of the same application program, the operating system image may examine the resource storage log and retrieve the program's estimated performance requirements. Using the estimated performance requirements, the one or more power models making up the performance control subsystem 60 (FIG. 1) may adjust the system performance accordingly.

In addition, if more than one application is to be concurrently executed, the estimated performance requirements of an application not yet executing may be combined with the resource requirements of a current set of executing applications, and the result can be used to appropriately configure the performance control subsystem 60 (FIG. 1) to cause the processing system 30 (FIG. 1) to operate at an appropriate performance level to execute that particular set of application programs with a minimum of wasted idle cycles.

In addition, during subsequent execution of an application, the performance measurement subsystem 50 (FIG. 1) may continue to monitor the performance requirements of the application, and it may update the estimate of the performance requirements of the application and store the updated estimate in the resource storage log 26 (FIG. 1) and/or in the resource description table 25 associated with the application.

Thus, the performance requirements of one or more applications may be determined dynamically. This may allow them to adjust to the particular usage patterns of a system user. For example, an audio player may have different resource usage depending upon the mix of music types played back. As another example, if a system user prefers always to have the system processor operate at peak capacity for one or more designated applications, at the expense of battery consumption, the corresponding APRIs for these applications will reflect this. Likewise, if the system user doesn't care whether the processor operates at reduced capacity for one or more designated applications, the corresponding APRIs will also reflect this. The performance measurement subsystem may observe such usage preferences and embody them in the APRI for the affected application.

Performance Control Subsystem

Upon execution of an application program for which one or more performance requirements have been measured and stored, the performance control subsystem 60 (FIG. 1), which may comprise one or more power models 112, 122, and/or 132 (FIG. 2), may retrieve the program's performance requirements (e.g. an APRI) Using the stored performance requirements, the performance control subsystem may adjust the system performance accordingly.

The performance control subsystem may combine the performance requirements of multiple applications and use the information to select the most power-efficient operating mode for the processing system and/or limit the subset of applications that are allowed to run at the same time.

The performance control subsystem may also examine the resource description table contained within (or separate but associated with the) application program image and determine the resource requirements of the application program.

The performance control subsystem may examine the peak and typical performance requirements of all the application programs that are currently loaded into the local memory, and it may cause the processing system to operate at an appropriate performance level to execute that particular set of application programs with an optimum performance level, e.g. with a minimum of wasted idle cycles.

The performance level of the processing system may be altered by any suitable method, including but not limited to frequency modulation or duty cycle modulation.

The performance control subsystem may prevent the execution of further applications when the processing system is already fully loaded. The performance control subsystem may allow the system user to set an upper threshold on the total application performance to be utilized.

Thus, the processing system performance can be dynamically adjusted to suit the currently executing task set. This allows for minimum power consumption for a task set, while still meeting real time requirements of the most demanding application. Operating at reduced power results in longer life using a given battery capacity, thus providing a significant advantage when the system is implemented in a battery-powered mobile device.

By allowing a system user to select a maximum allowable CPU performance, and by limiting the set of applications that is run concurrently, the battery life of the system can effectively be controlled by the system user, without the risk that the system may perform inadequately due to insufficient CPU cycles being available for the correct operation of the application or application set that is loaded. This enables the system performance to be relatively more predictable.

Figure 3:
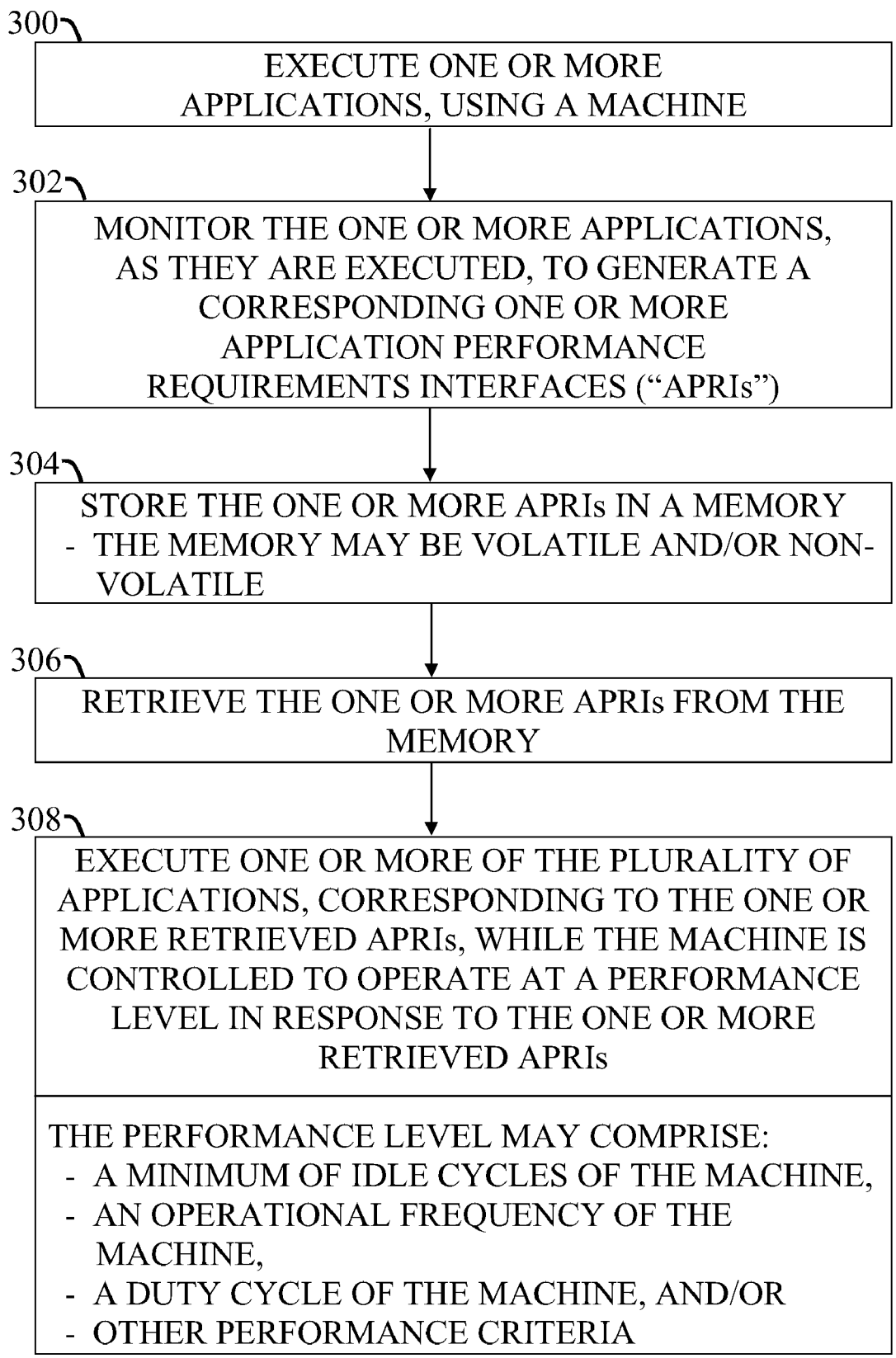
FIG. 3 is a flow diagram illustrating an example method to provide performance and resource monitoring and/or control, in accordance with an embodiment of the invention.

FIG. 3 is a flow diagram illustrating an example method to provide performance and resource monitoring and/or control, in accordance with an embodiment of the invention. Although the functions of monitoring and controlling are both shown in the flow diagram of FIG. 3, they could be performed separately in other embodiments.

In 300, one or more applications are executed, using a machine, such as processing system 30 of system 10 (FIG. 1). The applications and the machine may be of any type, including those mentioned elsewhere in this disclosure.

In 302, the one or more applications are monitored, as they are executed, to generate a corresponding one or more application performance requirements interfaces (APRIs). The APRI for a given application may include, in addition to the static and dynamic memory requirements of the application, the peak and the typical performance requirements of the application. "Peak performance requirements" are performance requirements that enable an application to be executed in an optimum manner, considering the type of application and the desired performance. Optimum characteristics may include one or more factors such as speed, resolution, quality, efficiency, energy utilization, material consumption, accuracy, and the like.

"Typical performance requirements" are performance requirements that enable an application to be executed in a typical manner, considering the type of application and the desired performance. Typical characteristics may include one or more factors of the kind mentioned above. Typical performance of an application generally has less demanding performance requirements than peak performance of the application. As an example, a screen resolution of a cellular telephone display may be lower for typical performance than for peak performance. As another example, the processor execution speed of a laptop computer executing a spreadsheet may be lower for typical performance than for peak performance.

In 304, the one or more APRIs are stored in a memory. In an embodiment, the one or more APRIs are stored in a storage system such as storage system 20 (FIG. 1). Storage system 20 may comprise volatile and/or non-volatile memory, as mentioned earlier regarding the description of FIG. 1. The one or more APRIs may be stored in a resource storage log such as resource storage log 26 (FIG. 1) and/or in a resource description table associated with an application, such as resource description table 25 (FIG. 1). The one or more APRIs may also be stored within local memory 40.

In 306, one or more of the APRIs are retrieved from the memory. Generally, if only one application is to be executed, just one APRI is fetched. If two applications are to be executed, two APRIs are fetched, and so forth.

In 308, one or more applications, corresponding to the one or more APRIs, are executed. The machine or platform is controlled to operate at a performance level that is determined by the one or more APRIs. In an embodiment, the machine's operating system builds a dynamic table of the performance requirements of applications run on the system. The operating system may combine the performance requirements of multiple applications. The resulting table may be stored in the resource storage log 26 (FIG. 1). The operating system may use the information to select the most power-efficient operating mode for the processing system, or it may limit the number of applications that are allowed to run at the same time.

In 308, the performance level mazy comprise any one or more desired performance criteria. As an example, the performance level criteria may include a minimum of idle cycles of the machine, e.g. that the machine execute instructions in a such manner that no more than N consecutive idle cycles occur, or that no more than N idle cycles occur in time period T. As another example, the performance level criteria may include a specific operation frequency, which may be measured in any suitable manner, e.g. in clock speed, millions of instructions processed per second (MIPS), or the like. As yet another example, the performance level criteria may include a specific duty cycle of the machine, e.g. that the machine be executing instructions at least a certain percentage of the time. Other performance criteria could also be used. For example, the performance level of the system could be controlled to a certain power level, to ensure that the system operation results in only a minimum utilization of battery resources, e.g. not to exceed a specified number of energy units per unit time.

Embodiments of the disclosed subject matter, including the performance measurement subsystem and performance control subsystem, may be implemented in any suitable way by those of ordinary skill in the art.

The operations described above with respect to the methods illustrated in FIG. 3 can be performed in a different order from those described herein.

Embodiments of the present subject matter enable an electronic system, such as a computer system, cellular telephone, entertainment device, or the like, to control its performance resources and energy resources, using application-based resource requirements. As a result, such system is more commercially attractive than a system without such capabilities.

Embodiments of the invention may be readily implemented in a variety of machine platforms and operating systems.

As shown herein, the present subject matter may be implemented in a number of different embodiments, including various methods, applications, modules, and systems, and in articles comprising machine-accessible media having associated instructions or, more generally, data. Other embodiments will be readily apparent to those of ordinary skill in the art. The elements, algorithms, and sequence of operations may all be varied to suit particular requirements.

Embodiments of the invention may be implemented in conjunction with program modules, including functions, constructs, procedures, data structures, application programs, etc. for performing tasks, or defining abstract data types or low-level hardware contexts. Program modules, including instructions, may be stored in storage system 20 and/or local memory 40 (FIG. 1) and associated computer storage media of any type, including those mentioned earlier. Program modules may be delivered over transmission environments, including networks (not shown), in the form of packets, serial data, parallel data, or any other suitable form. Program modules may be used in a compressed or encrypted format, and they may be used in a distributed environment and stored in local and/or remote memory, for access by single and multi-processor machines, or any other type of electronic system 10 (FIG. 1).

Those skilled in the art will appreciate that an embodiment of the invention may comprise an application having a procedure, which when executed by a machine, is to perform a function. The application may further include a construct to store at least one resource requirement to control the machine to operate at a desired performance level in executing the procedure.

Those skilled in the art will also appreciate that an embodiment of the invention may comprise a module having a first portion to get at least one resource requirement from a memory, and a second portion to control a machine to operate at a performance level in response to the at least one resource requirement.

In view of the disclosure herein, it will be apparent to those skilled in the art how to write suitable software routines that implement the functions, features, and operations discussed above.

The illustrated architecture of the electronic system described herein is only an example of possible architectures. Embodiments of the present subject matter are in no way limited to any particular architecture for the electronic system.

FIGS. 1 and 2 are merely representational and are not drawn to scale. Certain proportions thereof may be exaggerated, while others may be minimized. FIGS. 1-3 illustrate various embodiments of the subject matter that can be understood and appropriately carried out by those of ordinary skill in the art.

Although specific embodiments have been illustrated and described herein, it will be appreciated by those of ordinary skill in the art that any arrangement or process that is calculated to achieve the same purpose may be substituted for the specific embodiments shown. This application covers any adaptations or variations of embodiments of the inventive subject matter. Therefore, it is manifestly intended that embodiments of this inventive subject matter be limited only by the claims and the equivalents thereof.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. An article comprising a storage medium having associated data, wherein the data, when accessed, result in a machine performing:

monitoring a plurality of applications, as they are initially executed, to generate a corresponding plurality of application performance requirements interfaces ("APRIs");

storing the plurality of APRIs in a non-volatile memory;

retrieving one of the APRIs from the non-volatile memory; and re-executing one of the plurality of applications, corresponding to the retrieved APRI, while the machine is controlled to operate at a performance level in response to the retrieved APRI;

wherein, in re-executing, the performance level comprises a minimum of idle cycles of the machine.

2. The article recited in claim 1 wherein, in re-executing, the performance level comprises an operational frequency of the machine.

3. The article recited in claim 1, wherein the machine is battery-powered, and wherein the performance level comprises a selected utilization of battery resources.

4. The article recited in claim 1 wherein, in re-executing, the performance level comprises a duty cycle of the machine.

5. An article comprising a storage medium having associated data, wherein the data, when accessed, result in a machine performing:

executing a plurality of applications;

monitoring the plurality of applications, as they are initially executed, to generate a plurality of application performance requirements interfaces ("APRIs");

storing the plurality of APRIs in a non-volatile memory, each APRI corresponding to one of the plurality of applications to be executed by the machine;

retrieving one of the APRIs from the non-volatile memory; and subsequently executing one of the plurality of applications, corresponding to the retrieved APRI, while the machine is controlled to operate at a performance level in response to the retrieved APRI;

wherein, in subsequently executing, the performance level comprises a minimum of idle cycles of the machine.

6. The article recited in claim 5, wherein the machine is battery-powered, and wherein the performance level comprises a selected utilization of battery resources.

7. The article recited in claim 5 wherein, in subsequently executing, the performance level comprises a duty cycle of the machine.

8. The article recited in claim 5 wherein, in subsequently executing, the performance level comprises an operational frequency of the machine.

* * * * *